No. 703,319.
T. W. TALLQVIST.
HEMOGLOBINOMETER.
(Application filed Jan. 16, 1902.)
Patented June 24, 1902.
(No Model.)
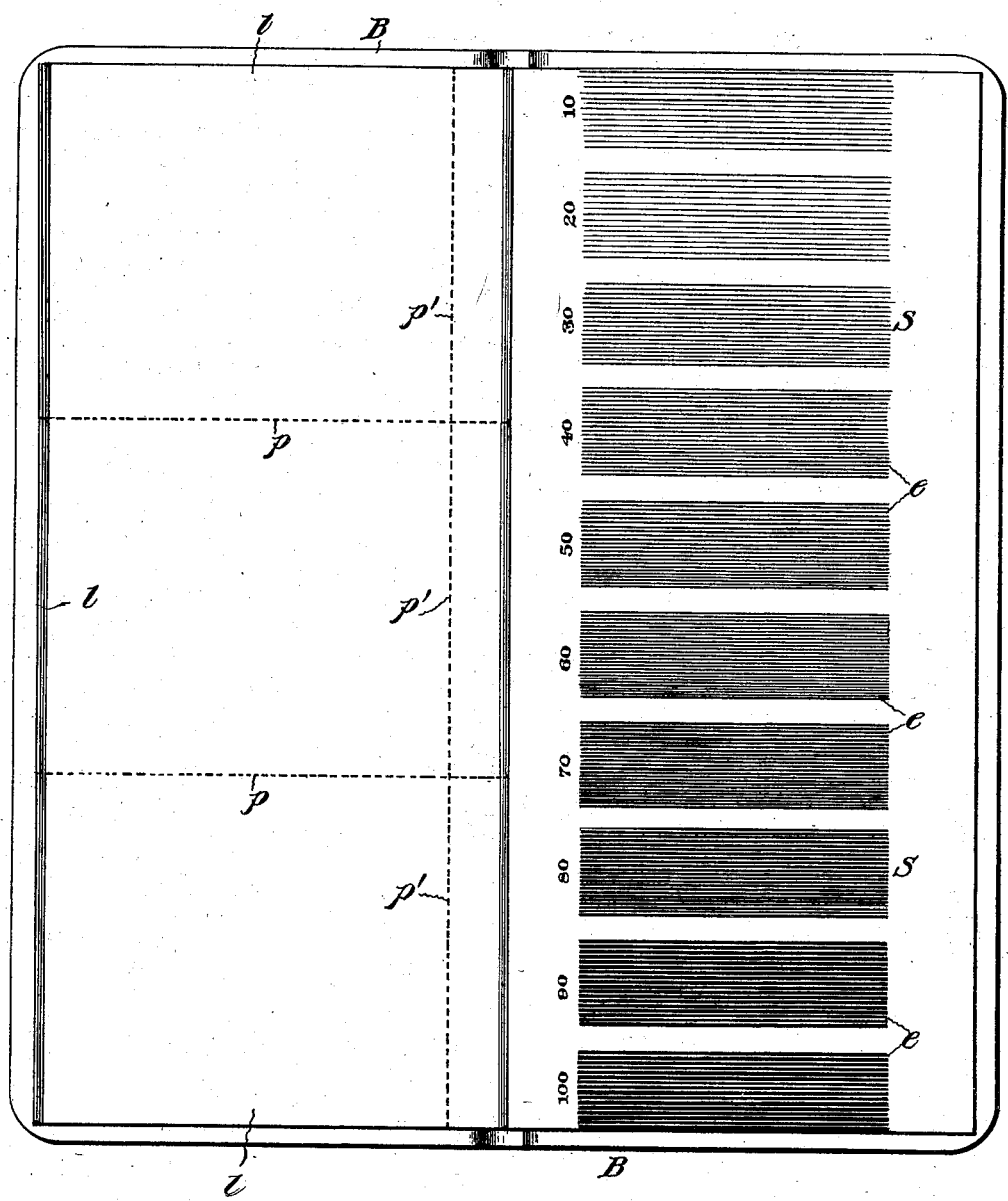

UNITED STATES PATENT OFFICE.

THEODOR WALDEMAR TALLQVIST, OF BORGÅ, RUSSIA.

HEMOGLOBINOMETER.

SPECIFICATION forming part of Letters Patent No. 703,319, dated June 24, 1902.

Application filed January 16, 1902. Serial No. 90,074. (No model.)

*To all whom it may concern:*

Be it known that I, THEODOR WALDEMAR TALLQVIST, a subject of the Grand Duke of Finland, Emperor of Russia, residing at No. 1 Parkgatan, in the town of Borgå, in the Grand Duchy of Finland, Russia, have invented certain new and useful Improvements in Hemoglobinometers; and I do hereby declare the following to be a full, clear, and exact description of the invention, such as will enable others skilled in the art to which it appertains to make and use the same.

It is well known that the ascertaining or measuring of the quantity of hemoglobin contained in the blood forms an important means for judging the state of disease in anemic patients. There are for this purpose already in existence various kinds of apparatus, most of which are based upon the same principle as my said invention—namely, on the colorimetric measurement of the quantity of hemoglobin. All these give more or less exact and reliable results; but they all have one disadvantage in common—namely, that an examination of the blood with their assistance can be done only under certain conditions and that such an examination requires time and is inconvenient. It must therefore prove a considerable boon to the medical practitioner if the cumbersome work with such an hemometer could be substituted by one single and easy observation, which can be made immediately when the patient is being examined and independently of a dark room, a special source of light, or other special circumstances. My investigations in this direction were preceded by somewhat extensive examinations of the natural color of the human blood at various degrees of diseased changes in the same. In order to obtain uniform results in judging the color of the blood, I used white filtering-paper, which was neared to the drop of blood in such a manner as to make it suck the blood slowly till the paper was thoroughly drenched by it. The color was then observed as soon as the blood-stain had lost its humid gloss, the stain being pressed against a pad of the same filtering-paper and the observation always being done by direct light. The blood, however, changes in color very quickly, owing to the action of the air, and it therefore became necessary to make artificial copies of the blood-stains before the change in color had begun. By making complete series of observations and artificial copies of the respective colors and by checking these through repeated observations I have determined that the color of the blood-stain on the filtering-paper from different patients and with different kinds of blood diseases is always the same at the same percentage of hemoglobin in the blood.

My invention relates to a scale of colors which I have composed on the basis of the researches described heretofore in such a manner that each shade of color in this scale corresponds to a certain stated quantity of hemoglobin contained in the blood.

The ascertaining of the quantity of hemoglobin by the aid of my scale is performed in the following manner: A sample of the blood under examination is taken on white filtering-paper of suitable quality in the manner described above, and this sample is compared with the said scale. The figure standing opposite that shade of color which is the nearest to correspond with the color of the said sample gives the percentage of hemoglobin in the blood under examination.

It is evident that an examination of the quantity of hemoglobin by the aid of my scale of colors will not give quite as exact results as when a proper hemometer is used for the purpose; but extensive comparative researches performed by myself as well as by other medical men have proved that the exactness only slightly deviates from the results obtained by the use of, for instance, the apparatus designed by Fleischl or the one by Gower.

In the accompanying drawing I have illustrated the preferred and very convenient mode of using my improved scale by a plan view.

In practice I prefer to bind the scale S either at the beginning or end of a book B of a size to be conveniently carried in the pocket, the leaves *l* of the book being made of white filtering-paper, and for convenience of use the leaves are divided into three sections by lines of transverse perforations *p* and each leaf perforated longitudinally along the back of the book, as shown at $p'$, so that the sections of the leaves can be readily removed for use. The colorimetric scale S consists of ten elements $e$ of different shades of the color of blood and indicating by the depth of color the percentage of hemoglobin in blood, from one hundred per cent. to ten per cent., which I deem amply sufficient for the purposes of the physician, the percentage being numerically indicated.

I declare that what I claim is—

1. Means for determining the percentage of hemoglobin in blood by comparison, comprising a scale of colors varying in depth of color to indicate variations in the percentage of hemoglobin in blood, and a receiver for the blood to be compared, said receiver of a contrasting color and capable of absorbing the blood and leave a mat surface.

2. Means for determining the percentage of hemoglobin in blood by comparison, comprising a scale of colors varying in depth of color to indicate variations in the percentage of hemoglobin in blood, and a receiver for the blood to be compared, said receiver of a contrasting color and of an indifferent material, and capable of absorbing the blood and leave a mat surface.

3. Means for determining the percentage of hemoglobin in blood by comparison, comprising a scale of colors varying in depth of color to indicate variations in the percentage of hemoglobin in blood, and a receiver of white filter-paper for the blood to be compared.

4. Means for determining the percentage of hemoglobin in blood by comparison, consisting of a colorimetric scale composed of separate elements differing in depth of color in accordance with percentages of hemoglobin, and sheets of white filter-paper divided transversely into sections by lines or perforations and having a line of perforations along one edge, the whole bound in book form, for the purpose set forth.

In testimony that I claim the foregoing as my invention I have signed my name in presence of two subscribing witnesses.

THEODOR WALDEMAR TALLQVIST.

Witnesses:
K. SITTMITOM,
O. LAURIN.